Patented Sept. 15, 1953

2,652,346

UNITED STATES PATENT OFFICE 2,652,346

CELLULOSE PROPIONATE GEL LACQUER COMPOSITION AND METHOD OF APPLYING

Ralph E. Porzer, Bloomfield, N. J., and Alan P. Baruch, Stamford, Conn., assignors to Celanese Corporation of America, a corporation of Delaware No Drawing. Application October 19, 1948, Serial No. 55,427

10 Claims. (Cl. 117—85)

This invention relates to lacquers, and relates more particularly to gel lacquers comprising cellulose propionate in a mixture of propyl, isopropyl, butyl or amyl acetate and xylol or toluol and to a process for applying said lacquers.

As is well known, gel lacquers comprise a mixture of film-forming ingredients and a liquid medium which produce colloidal solutions at elevated temperatures and set to a gel at reduced temperatures. An object may be coated with a gel lacquer solution at elevated temperatures and the lacquer coating will gel as soon as its temperature is reduced to the gelation point. Thereafter, the liquid medium may be evaporated from the coating, producing a lacquer film. This method of coating is particularly desirable since the lacquer does not drain from the coated article, permitting single coatings to be applied which are from ten to fifteen times as thick as those obtained from conventional lacquers. Moreover, the coatings obtained from gel lacquers are considerably tougher than conventional lacquer coatings. Despite the advantages of gel lacquers and the considerable amount of work done on their development, most of the gel lacquers hitherto proposed are unsatisfactory since they do not produce clear, self-supporting films and they exhibit syneresis or the separation of the liquid and solid phases.

It is an important object of this invention to provide a novel gel lacquer comprising cellulose propionate in a mixture of propyl, isopropyl, butyl or amyl acetate and xylol or toluol which will be free from the foregoing and other disadvantages of the gel lacquers hitherto proposed.

A further object of this invention is the provision of a process for coating articles with a gel lacquer comprising cellulose propionate in a mixture of propyl, isopropyl, butyl or amyl acetate and xylol or toluol.

Other objects of this invention will be apparent from the following detailed description and claims.

In accordance with our invention we prepare a gel lacquer in which the film-forming ingredient is cellulose propionate and the liquid medium into which said cellulose propionate is incorporated is a mixture of propyl, isopropyl, butyl or amyl acetate and xylol or toluol. The cellulose propionate may be completely esterified, having a propionyl content of about 67% calculated as propionic acid. It is preferred, however, to employ a cellulose propionate having a propionyl content between about 63 and 65% calculated as propionic acid since its solubility characteristics are superior to those of the completely esterified material. Various expedients may be employed to obtain a cellulose propionate having the desired propionyl content. For example, fully esterified cellulose propionate may be hydrolyzed to reduce its propionyl content, or the propionation of a cellulosic material may be interrupted when the cellulose propionate has acquired the desired propionyl content.

The proportion of cellulose propionate employed in the gel lacquer may be varied over a wide range. Generally, however, satisfactory results may be obtained with from about 15 to 40 parts by weight of cellulose propionate for each 100 parts by weight of the liquid medium. In addition to the cellulose propionate, the gel lacquer may contain up to about 6 parts by weight of a plasticizer for the cellulose propionate for each 100 parts by weight of the liquid medium to improve the toughness of the lacquer film. Any cellulose propionate plasticizer may be employed for this purpose among which are dibutyl sebacate, butoxyethyl stearate, dibutyl phthalate, dioctyl phthalate or tricresyl phosphate either separately or in combination.

For any given proportion of cellulose propionate or cellulose propionate and plasticizer in the lacquer, the ratio of propyl, isopropyl, butyl or amyl acetate to xylol or toluol in the liquid medium will control the temperature at which the lacquer gels. Thus, for example, when employing about 25 parts by weight of cellulose propionate and plasticizer for each 100 parts by weight of the liquid medium, the gelation temperature will range from about 65° C. with about 10% by weight of butyl acetate and about 90% by weight of xylol in the liquid medium to about 15° C. with about 50% by weight of butyl acetate and about 50% by weight of xylol in the liquid medium. It is generally preferred to have the gelation temperature range from about 15 to 35° C., which will require, for example, from about 50 to 30% by weight of butyl acetate and from about 50 to 70% by weight of xylol in the liquid medium, to avoid the necessity for artificial cooling and to limit the amount of heating needed to maintain the lacquer in liquid form.

Although satisfactory gel lacquers are obtained when the liquid medium comprises a mixture of propyl, isopropyl, butyl or amyl acetate with xylol or toluol, it is preferred to employ a mixture of butyl acetate and xylol for this purpose. This particular mixture permits of the widest variation in the gelation temperature of the lacquer and produces the most satisfactory final products.

The gel lacquers of this invention are particularly adapted for the production of coatings on articles made of wood, metal, plastic or other material. The lacquers may be applied by dipping, brushing, spraying or in any other manner producing coatings ten to fifteen times as thick as single coatings of conventional lacquers. To improve the adhesion of the lacquer film, particularly when a non-porous wood or metal article is being coated, an undercoat of a cellulose nitrate or similar lacquer of the conventional type may be applied to the said article before the gel lacquer is applied thereto. An under coat also serves to prevent the formation of bubbles in the gel lacquer caused by the escape of air from cracks, crevices or pores in the coated article. If desired, dyes, pigments, nacreous substances or similar materials may be added to the gel lacquer for ornamental purposes.

In addition to being used for the production of coatings, the lacquers of this invention may also be employed for the production of films, foils, filaments, castings and similar articles by casting, coating or extrusion as is well known in the art.

The following examples are given to illustrate this invention.

Example I

To 100 parts by weight of a liquid medium containing 40% by weight of butyl acetate and 60% by weight of xylol there is added a mixture of 22 parts by weight of cellulose propionate having a propionyl value of about 64% calculated as a propionic acid, 3 parts by weight of dibutyl sebacate, and 1 part by weight of butoxyethyl stearate. Heat is applied to the mixture with stirring until the temperature reaches about 70° C. producing a clear, relatively viscous solution which sets to a gel at about 28° C. A metallic article is dipped into the lacquer solution and the lacquer adhering to said article upon its withdrawal from the solution sets to a gel within a few seconds. Thereafter, the liquid medium is evaporated from the gel layer by passing a stream of air over the coated article producing a smooth lacquer layer approximately .015 inch thick. The lacquer layer produced in this manner is unaffected by high temperatures and humidities and is highly resistant to impact.

Example II

To 100 parts by weight of a liquid medium containing 50% by weight of butyl acetate and 50% by weight of xylol there is added a mixture of 22 parts by weight of cellulose propionate having a propionyl value about 63% calculated as propionic acid, and 2½ parts by weight of dibutyl phthalate. Heat is applied to the mixture with stirring until the temperature reaches about 60° C. producing a clear, relatively viscous solution which sets to a gel at about 15° C. A wood article, to which a thin cellulose nitrate undercoating has been applied by spraying is dipped into the lacquer solution and the lacquer adhering to said article upon its withdrawal from the solution sets to a gel within a few seconds. Thereafter, the liquid medium is evaporated from the gel layer by passing a stream of air over the coated article, producing a smooth layer approximately .020 inch thick. The lacquer layer produced in this manner is unaffected by high temperature and humidities and is highly resistant to impact.

It is to be understood that the foregoing detailed description and claims is given merely by way of illustration and that many variations may be made therein without departing from the spirit of our invention.

Having described our invention, what we desire to secure by Letters Patent is:

1. Gel lacquers comprising from about 15 to 40 parts by weight of cellulose propionate in about 100 parts by weight of a solvent mixture in which the solvents consist of from about 50 to 10% by weight of a material of the group consisting of propyl acetate, isopropyl acetate, butyl acetate and amyl acetate and from about 50 to 90% by weight of a material of the group consisting of xylol and toluol.

2. Gel lacquers comprising from about 15 to 40 parts by weight of cellulose propionate having a propionyl content between about 63 and 67% calculated as propionic acid in about 100 parts by weight of a solvent mixture in which the solvents of from about 50 to 10% by weight of a material of the group consisting of propyl acetate, isopropyl acetate, butyl acetate and amyl acetate and from about 50 to 90% by weight of a material of the group consisting of xylol and toluol.

3. Gel lacquers comprising from about 15 to 40 parts by weight of cellulose propionate in about 100 parts by weight of a solvent mixture in which the solvents consist of from about 50 to 10% by weight of butyl acetate and from about 50 to 90% by weight of xylol.

4. Gel lacquers comprising from about 15 to 40 parts by weight of cellulose propionate having a propionyl content between about 63 and 67% calculated as propionic acid in about 100 parts by weight of a solvent mixture in which the solvents consist of from about 50 to 10% by weight of butyl acetate and from about 50 to 90% by weight of xylol.

5. Gel lacquers comprising from about 15 to 40 parts by weight of cellulose propionate in about 100 parts by weight of a solvent mixture in which the solvents consist of from about 50 to 30% by weight of butyl acetate and from about 50 to 70% by weight of xylol.

6. Gel lacquers comprising from about 15 to 40 parts by weight of cellulose propionate having a propionyl content between about 63 and 65% calculated as propionic acid in about 100 parts by weight of a solvent mixture in which the solvents consist of from about 50 to 30% by weight of butyl acetate and from about 50 to 70% by weight of xylol.

7. Gel lacquers comprising about 22 parts by weight of cellulose propionate having a propionyl content of about 64% calculated as propionic acid in about 100 parts by weight of a solvent mixture in which the solvents consist of about 40% by weight of butyl acetate and about 60% by weight of xylol.

8. Gel lacquers comprising about 22 parts by weight of cellulose propionate, about 3 parts by weight of dibutyl sebacate and about 1 part by weight of butoxyethyl stearate in 100 parts by weight of a solvent mixture in which the solvents consist of about 40% by weight of butyl acetate and about 60% by weight of xylol.

9. Process which comprises applying an undercoating to the surface of an article, coating said article with a gel lacquer comprising from about 15 to 40 parts by weight of cellulose propionate in about 100 parts by weight of a solvent mixture in which the solvents consist of from about 50 to 10% by weight of a material of the group consisting of propyl acetate, isopropyl acetate, butyl acetate and amyl acetate and from about 50 to 90% by weight of a material of the group consisting of xylol and toluol, and gelling the coating so produced by reducing its temperature below the gelation temperature.

10. Process which comprises applying a cellulose nitrate undercoating to the surface of an article, coating said article with a gel lacquer comprising from about 15 to 40 parts by weight of cellulose propionate in about 100 parts by weight of a solvent mixture in which the solvents consist of from about 50 to 10% by weight of a material of the group consisting of propyl acetate, isopropyl acetate, butyl acetate and amyl acetate and from about 50 to 90% by weight of a material of the group consisting of xylol and toluol, and gelling the coating so produced by reducing its temperature below the gelation temperature.

RALPH E. PORZER.
ALAN P. BARUCH.

References Cited in the file of this patent

UNITED STATES PATENTS

| Number | Name | Date |
|---|---|---|
| 1,934,261 | Ellis | Nov. 7, 1933 |
| 2,317,696 | Rich | Apr. 27, 1943 |
| 2,332,461 | Muskat et al. | Oct. 19, 1943 |
| 2,350,742 | Fordyce et al. | June 6, 1944 |
| 2,350,987 | Collings | June 13, 1944 |
| 2,367,503 | Hunter et al. | Jan. 16, 1945 |
| 2,400,453 | Bogin | May 14, 1946 |
| 2,401,272 | Quinn | May 28, 1946 |
| 2,452,209 | Rehberg et al. | Oct. 26, 1948 |
| 2,510,177 | Horback | June 6, 1950 |
| 2,547,047 | Saums | Apr. 3, 1951 |